United States Patent Office 3,306,026
Patented Feb. 28, 1967

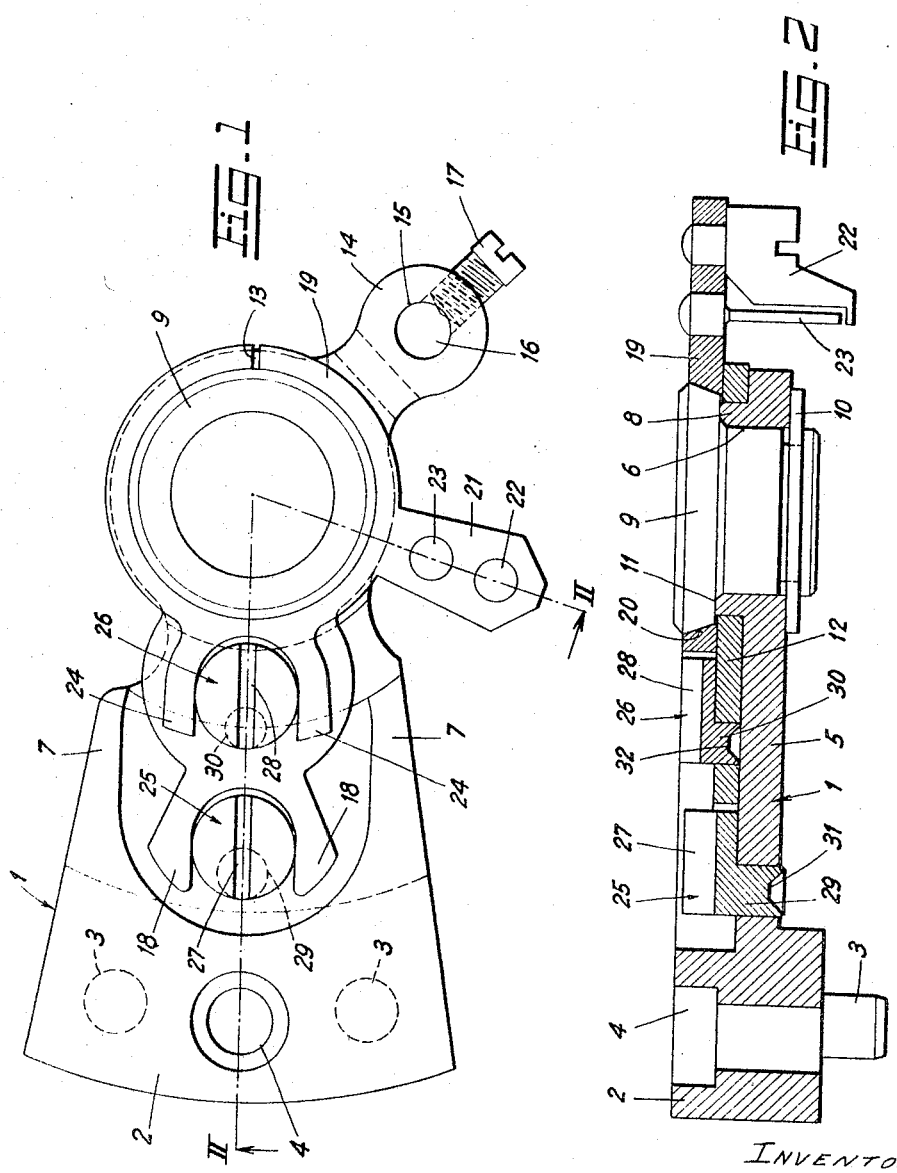

3,306,026
REGULATING DEVICE FOR A WATCH MOVEMENT
Hans Kocher, Buren an der Aare, Switzerland, assignor to Büren Watch Company S.A., Buren an der Aare, Switzerland, a company limited by shares
Filed Aug. 9, 1963, Ser. No. 301,024
Claims priority, application Switzerland, Aug. 14, 1962, 9,741/62
2 Claims. (Cl. 58—109)

The present invention relates to a regulating device for a watch movement of the type comprising a regulator and a movable stud holder arranged in juxtaposition on top of the balance cock, and a pair of driving members for the stud holder and for the regulator, the first of said driving members being pivoted on the cock and the second on the stud holder.

In the heretofore known regulating devices of this particular type the regulator remains stationary with respect to the stud holder when the position of the latter is modified, for example, for setting purposes. Moreover, when the position of the regulator is modified the torsional moment to which this piece is submitted is supported by the stud holder, which in turn is connected with the balance cock by the second driving member. It results therefrom that the adjustment of the regulator may be effected without risk of displacement of the stud holder, provided that the rotational fit of the regulator and of the stud holder is satisfactory.

Yet the known regulating devices of the mentioned type, unfortunately, are rather thick and may not, for this reason, be applied to extra-thin or extra-small watch movements. In addition thereto, they lack precision in operation. This is due to the fact that, in the aforementioned known regulating devices, the driving members for the stud holder and for the regulator consist of pinions each engaging a toothed portion of the driven member. Each of these regulator pinions has a central pivot carrying a disk provided with cut-outs on its periphery. The said pivot engages an opening in the piece that carries it. The disk is lodged in a circular groove of this member and affords for the pinion to be driven by means of a tip engaging one of the cutouts in the disk periphery.

The driving system by means of pinions and racks used in the mentioned known devices makes possible to displace the regulator or the stud holder for a wide angle that is only limited by the rack length of the said member. But on the other hand this driving system necessarily presents a certain play that renders impossible a perfectly precise positioning of the regulator or the stud holder. Now the machines that are actually used in the horological industry for checking the adjustment of watch movement require a very precise adjustment. In turn they make possible adjustments of high precision by means of the regulator, provided, of course, that the drive of the latter, in turn, is free from play.

It is known, furthermore, that a piece, pivoted on another one may be displaced with precision with the help of a cam or an eccentric pivotally mounted on one of the pieces and bearing against the other of these pieces. The angle about which both pieces may be moved is limited but the precision that may be reached with this type of adjustment is very high.

The present invention aims to avoid the drawbacks inherent to the already known devices of the aforementioned type whereby it takes into consideration that the actually used counting and stud setting devices are of such precision as to make necessary slight retouches of small amplitude only, in the subsequent adjustment operation. Therefore it is an object of the present invention to provide a regulating device for a watch movement that is easily operated.

It is then a further object of the invention to provide a regulating device that, in addition to its easy operation affords for a higher precision than was possible with previously known regulating devices.

A further object of the invention is to realize a regulating device of simple construction and, last but not least of smaller height than previously known regulating devices, so that it might be incorporated in modern extra-thin watches.

To this end in the regulating device of the present invention each of the driving members comprises an eccentric means engaged between a pair of arms of the driven member.

Other features and advantages of the present invention will become apparent from the description, now to follow, of a preferred embodiment thereof, given by way of example only, and in which reference will be made to the accompanying drawing, in which:

FIG. 1 is a top view of a regulating device according to the invention, and

FIG. 2 is a sectional view through the device of FIG. 1, taken along the line II—II in this FIGURE 1.

The illustrated regulating device is arranged on the balance cock 1 of a wrist watch. This cock comprises a thick portion provided on its lower surface with a pair of holding studs 3 and with a central opening 4 for securing the cock to the plate. The cock 1 further comprises a board 5 having in its forward end a boring 6. The thick portion 2 of the cock 1 is formed with two flanges 7 extending in direction towards the end of the board 5 and along the longitudinal sides of the latter bordering a central portion of this board. An annular flange 8 protruding upwardly beyond the board 5 extends about the boring 6. The balance cock 1 carries an end piece 9 driven into the boring 6 and positioned by a lock 10. The end piece 9 has a shoulder portion 11 supported on the upper surface of the annular flange 8. The latter comprises a cylindrical lateral surface forming a pivoting surface for a stud holder 12 constituted by a thin plate and having an annular portion surrounding the flange 8 and slotted as shown at 13; an eyelet 14 the opening of which, designated by reference numeral 15 being adapted to receive a stud 16; and a tail portion with two resilient arms 18 extending therefrom. The thickness of the eyelet is superior to that of the remainder of the stud holder. A threaded radial boring in the eyelet 14 is adapted to receive a set screw 17 for fixing the stud 16. The tail portion of the stud holder 12 extends above of the board 5 and between the flanges 7. The plate forming the stud holder 12 is so arranged at the level of the flange 8 that the latter may pivot about the axis of the end piece 9. Thereby resiliency of the annular portion of the stud holder 12 affords for a frictional engagement of the latter on the flange 8.

The described and illustrated device further comprises: a regulator 19 also constituted by a radially slotted annular central portion, whereby in FIGURE 1 the regulator slot corresponds to the slot 13 of the stud holder 12; an ear 21 carrying a key 22 and a pin 23 these members being of conventional structure; and a short tail portion formed exclusively of two resilient arms 24 engaged between the flanges 7 of the cock 1 above of the central portion of the stud holder tail portion. The regulator 19 is mounted for pivotal movement about a conical bearing surface 20 of the end piece 9 and is directly supported by the stud holder 12.

Finally the described and illustrated device comprises two adjusting members 25 and 26 serving the first of them to adjust the position of the stud holder 12 on the cock 1 and the second of them to adjust the position of the regulator 19 with respect to the stud holder 12.

Each of these adjusting members is made of one piece and comprises: a circular disk, diametrically slotted as at 27 and 28 respectively, in its upper part; and a cylindrical tenon (29 and 30 respectively) extending parallelly to the disk axis but eccentrically protruding from the lower face thereof. The tenons of the adjusting members are engaged in corresponding openings in the board 5 of the cock 1 and in the central portion of the stud holder tail, respectively.

As it clearly appears from FIG. 1 the eccentrics 25 and 26 are each engaged between the resilient arm pairs (18, 24) of the stud holder 12 and of the regulator 19 respectively. Adjustment of the member controlled by these eccentrics is easily and precisely carried out by simple rotation of the eccentrics by means of a screw driver. The rotational movement takes place without any play since both resilient arms 18 or 24, respectively, of the driven member bear against the corresponding eccentric. Thus a very high precision is attained in the adjustment and regulating. The fixation of the members 25 and 26 is obtained by a slight setting ascertaining their axial positioning while permitting pivotal movement about their axis. To this end each of the tenons 29 and 30 has a recess 31 and 32, respectively, formed in its lower face.

Of course the use of eccentrics for the adjustment of the stud and the regulating of the regulator limits the amplitude of the possible displacements of these members on the cock. However, if, as previously stated, it is considered that the precision of the modern counting and setting machines reduces the subsequent final adjustments to slight retouches, the range of adjustment of the stud holder 12 or of the regulator, permitted by the eccentrics 25 and 26, respectively, is more than sufficient. Moreover, since the eccentrics 25 and 26 are engaged without play between the resilient arm pairs 18 and 24, respectively, they render possible the positioning with high precision of the member controlled by them. For example it has been found that the described device enables adjustments of watch movements by the regulator down to a second a day. Also the stud holder may be adjusted with high precision without modification of the regulator adjustment. Since further the described eccentrics are slotted or grooved and may therefore be driven by a simple screw driver the said adjusting and regulating operations may be effected without special tools. A further advantage of the described regulating device resides in the fact that the eccentrics, since they are entirely engaged between the resilient arms of the members driven thereby cannot be inadvertantly disengaged from these members. Moreover the flanges 7 limit the lateral displacements of the eccentrics in both directions.

In the described and illustrated regulating device the regulator and the stud holder pivot independently of each other since the regulator is carried by the end piece and the stud holder is carried by a cock portion. Thus the stud holder is fixed to a stationary piece and the regulator to a piece that is in turn rigidly secured to the cock. Thereby the difficulties resulting in arrangements where the regulator is pivoted on the stud holder are avoided.

Last but not least the described regulating device may be realized of a thickness that is substantially inferior to that of the heretofore known devices of this type. Its total height is determinated by the thickness of the cock board, that of the stud holder and that of the regulator. Now the thickness of all these elements may be reduced to a minimum the more since the flanges 7 affording for the rigidity of the cock board the latter may be thinned to a large extent and no additional thickness is required for the driving members for the stud holder and the regulator.

It is to be noted that the full height of the bearing surface 20 of the end piece serves to guide the regulator.

I claim:
1. A regulating device for a watch movement comprising a balance cock having a boss formed on its upper face and an opening coaxial to said boss, an end piece fitted in said opening and having a conical bearing surface extending radially beyond said boss, a stud holder mounted for pivotal movement about said boss, a regulator placed on said stud holder in contact therewith and mounted for pivotal movement about said end piece, both said stud holder and regulator having each a radially slotted annular portion frictionally engaging said boss and said end piece bearing surface, respectively, a first driving means mounted on the stud holder for displacing the regulator relatively to the stud holder and a second driving means mounted on the cock for displacing the stud holder with respect to the cock, said stud holder and said regulator thereby forming driven elements, each of said driving means being formed of a circular piece having a cylindrical tenon frictionally engaged in a corresponding opening of the stud holder and the cock, respectively, said circular piece being eccentric to said tenon and said stud holder and regulator each having a pair of resilient arms, whereby each of said circular pieces is frictionally engaged between the resilient arms of the driven element associated to it and is embraced thereby, in which the regulator and the stud holder extend in a recessed portion of the balance cock, said recessed portion being bordered by a pair of flanges extending along both sides of said stud holder and regulator and forming abutments limiting lateral displacements of said stud holder and of said regulator.

2. A regulating device as claimed in claim 1, said regulator and stud holder each comprising a single flat plate of constant thickness formed with a pair of resilient arms at their rear portion.

References Cited by the Examiner

UNITED STATES PATENTS 621,245   3/1899   Hart ---------------- 58—109

FOREIGN PATENTS 517,902   12/1920   France.
276,768   10/1951   Switzerland.
338,769   5/1959    Switzerland.
347,770   7/1960    Switzerland.

RICHARD B. WILKINSON, *Primary Examiner.*

JOSEPH P. STRIZAK, LEO SMILOW, *Examiners.*

G. F. BAKER, *Assistant Examiner.*